US010358368B2

(12) United States Patent
Pardo et al.

(10) Patent No.: US 10,358,368 B2
(45) Date of Patent: Jul. 23, 2019

(54) OPTIMISATION OF A PULP TREATMENT METHOD

(71) Applicant: SUEZ INTERNATIONAL, Paris la Defense (FR)

(72) Inventors: Pierre Emmanuel Pardo, Orsay (FR); Hugues Vanden Bossche, Ville D'avray (FR)

(73) Assignee: SUEZ INTERNATIONAL, Paris (FR)

( * ) Notice: Subject to any disclaimer, the term of this patent is extended or adjusted under 35 U.S.C. 154(b) by 4 days.

(21) Appl. No.: 15/547,724

(22) PCT Filed: Feb. 2, 2016

(86) PCT No.: PCT/IB2016/050517
§ 371 (c)(1),
(2) Date: Jul. 31, 2017

(87) PCT Pub. No.: WO2016/125076
PCT Pub. Date: Aug. 11, 2016

(65) Prior Publication Data
US 2018/0022626 A1    Jan. 25, 2018

(30) Foreign Application Priority Data

Feb. 2, 2015 (FR) ...................... 15 50780

(51) Int. Cl.
C02F 3/00    (2006.01)
C02F 9/00    (2006.01)
(Continued)

(52) U.S. Cl.
CPC ............... C02F 9/00 (2013.01); C02F 3/006 (2013.01); C02F 11/04 (2013.01); C02F 11/12 (2013.01);
(Continued)

(58) Field of Classification Search
CPC .... C02F 11/18; C02F 11/12; C02F 2301/106; C02F 2303/06; C02F 3/34
See application file for complete search history.

(56) References Cited

U.S. PATENT DOCUMENTS

2006/0163155 A1*  7/2006  Chauzy ................. C02F 3/1221
                                                            210/605
2012/0094363 A1   4/2012  Nawawi-Lansade et al.
(Continued)

FOREIGN PATENT DOCUMENTS

CA    2 752 747 A1    8/2010
CN    102974592 A     3/2013
(Continued)

OTHER PUBLICATIONS

International Search Report, dated Apr. 1, 2016, from corresponding PCT application No. PCT/IB2016/050517.

Primary Examiner — Ana M Fortuna
(74) Attorney, Agent, or Firm — Young & Thompson

(57) ABSTRACT

Disclosed is a method for treating pulp, particularly a method for treating sludge from wastewater treatment plants, for producing energy and/or organic materials that have undergone hygienization, including at least the following steps: a step of aerated or non-aerated thermal hydrolysis of the pulp, a digestion step, a dehydration step and a step of recirculating part of the dehydrated pulp into the step of thermal hydrolysis.

7 Claims, 1 Drawing Sheet

(51) Int. Cl.
*C02F 11/04* (2006.01)
*C02F 11/12* (2019.01)
*C02F 11/18* (2006.01)

(52) U.S. Cl.
CPC ......... *C02F 11/18* (2013.01); *C02F 2209/005* (2013.01); *C02F 2209/06* (2013.01); *C02F 2209/40* (2013.01); *C02F 2301/046* (2013.01); *C02F 2301/106* (2013.01); *Y02E 50/343* (2013.01); *Y02W 10/15* (2015.05)

(56) References Cited

U.S. PATENT DOCUMENTS

| | | | |
|---|---|---|---|
| 2015/0050707 A1* | 2/2015 | Gapes | C02F 3/28 435/134 |
| 2015/0191384 A1* | 7/2015 | Pardo | C02F 3/286 210/603 |
| 2017/0210625 A1* | 7/2017 | Pardo | C02F 11/10 |

FOREIGN PATENT DOCUMENTS

| | | |
|---|---|---|
| CN | 203373248 U | 1/2014 |
| EP | 0 564 298 A1 | 10/1993 |
| EP | 2 796 419 A1 | 10/2014 |
| FR | 3 003 558 A1 | 9/2014 |
| WO | 96/09882 A1 | 4/1996 |
| WO | 2012/019310 A1 | 2/2012 |
| WO | 2013/155631 A1 | 10/2013 |
| WO | 2013/190486 A1 | 12/2013 |

\* cited by examiner

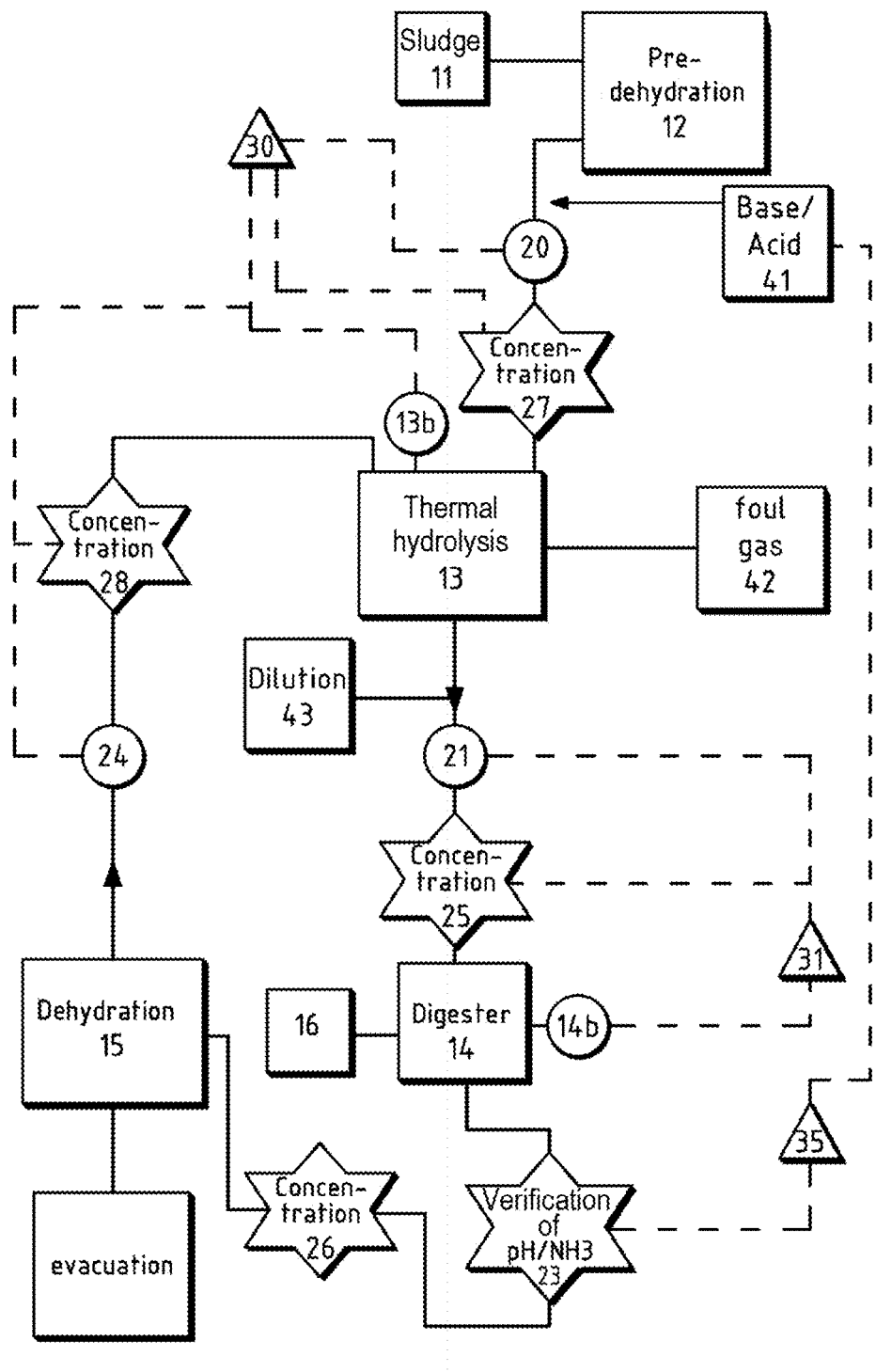

OPTIMISATION OF A PULP TREATMENT METHOD

The present invention relates to an optimized method for treating pulp, in particular sludge from a purification plant.

The field of the invention is that of thermal hydrolysis, that is to say the placing of a substrate under pressure and at a temperature in order to improve its capacity for digestion by anaerobic bacteria for the purpose of producing biogas.

The hydrolysis of pulp, a particulate organic matter, combined with anaerobic digestion, is a known method.

It is aimed at increasing the solubilization of the pulp and at thus improving the yield of the digestion and its production of biogas. This method is applicable to any pasty organic substrate that may be the subject of anaerobic digestion, in particular to purification sludge. In the remainder of the text, the terms "pulp", "organic matter" and "sludge" are equivalent.

Among these methods, thermal hydrolysis which combines the effects of heating at high temperature and generally of abrupt depressurization is the most widely used method. It can be carried out in a reactor continuously or by a batchwise method comprising several reactors or else one or more reactors combined with buffer chambers. The most common heating mode of these methods is steam injection, which is used to bring the sludge to the temperature required for the hydrolysis (generally 150 to 180° C.)

The investment required by the hydrolysis process which completes the digestion is subsequently compensated for by a saving in terms of the digestion operating costs linked to the improvement in the production of biogas (allowing energy production) and also the decrease in the amount of solids to be removed owing to the increased removal of the volatile matter but also the better dehydratability of the digestate. However, the return on the investment is generally long-term since the facilities are expensive.

The profitability of thermal hydrolysis is greatly improved in that it also allows a decrease in the volume of the digestion facilities. In wet digestion methods, this reduction in volume is promoted by the rheology of the organic matter leaving the hydrolysis step. Indeed, the hydrolysis treatment has the effect of drastically reducing the viscosity of the products, which facilitates the stirring thereof and makes it possible to substantially increase the feed concentration and thus the volumetric loading of the structures, that is to say the amount of matter to be digested expressed in $kg/m^3/d$.

At the end of the hydrolysis, the permitted feed concentration is no longer limited by rheological constraints, but is instead linked to the risk of toxicity of the free ammonia dissolved in the digester.

This is because, during the digestion, most of the nitrogen of the organic matter removed is released in the form of an aqueous ammonia solution consisting essentially of ammonium and of a minor part of dissolved ammonia dependent on the pH. This fraction proves to be toxic to methanogenic bacteria. It is all the greater the higher the pH and the higher the initial concentration of the volatile matter. Some methods bypass this limit by performing a first phase of digestion of the sludge before hydrolysis. The hydrolysis subsequently carried out is preceded by a sludge concentration step during which part of the ammoniacal nitrogen released by the first conventional digestion phase is removed so as to allow a second more extensive digestion phase. In other words, at the end of a thermal hydrolysis, it is often necessary to dilute sludge in order to avoid experiencing constraints of ammonia toxicity.

It is also known that maintaining the pH in a digester is an important operating parameter since bacteria require stable conditions in order to function. Furthermore, when the pH increases, the proportion of dissolved $NH_3$ will increase relative to $NH_4^+$, which increases the toxicity. On the other hand, if the pH is allowed to drop too much, for example by an increase in volatile fatty acids, which are intermediate products of the reaction, acetic acid is no longer available for the methanogenic bacteria and no longer produces biogas.

Another particularity of anaerobic digestion is the fact that the reactions which occur are the result of a very complex consortium of symbiotic bacterial populations forming a trophic chain. This means that the products of the metabolism of a population of bacteria serve as substrate for the next population. In this trophic chain, certain populations of bacteria, in particular acetoclastic bacteria and acetogenic bacteria, have slow growth kinetics compared with the other populations. As a result, the proportioning of the digesters must guarantee residence times that are sufficient to prevent leaching of these populations, when the feed flow rate is at its maximum.

Moreover, excessive rapid variations in loading at entry tend to induce, at digestion, transient imbalances between the populations of which the growth rates are very variable. There is then a risk of accumulation of the intermediate products of the reaction, such as volatile fatty acids, which accumulations can become detrimental to the reaction above a certain concentration. As a result, the digesters are not very capable of withstanding significant variations in loading, in particular when the feed concentrations are high. Conversely, when the digester is fed at a loading less than its design loading, the gain in removal yield is very limited. This is because the conventional proportioning ensures a hydraulic residence time (at nominal loading) corresponding to the asymptotic part of the curve which links yield and hydraulic residence time. In addition, during a low-loading episode, the weights of the populations of active bacteria decrease proportionally to the decrease in substrate. The digester is then incapable of rapidly recovering its nominal treatment capacity. It is thus essential not to have jolts in loading of the digester.

Finally, the thermal hydrolysis can also be placed downstream of the digestion in order to even further improve the digestion (possible digestion of product not digested in a first step). However, this equipment placed downstream is even less profitable than a hydrolysis placed upstream since the new digester constructed will destroy only a small part of the organic matter, the greater part being destroyed in the first thermal hydrolysis and the digestion. Furthermore, if a single digester is used, two expensive devices are constructed, namely the two thermal hydrolyses. Thus, although the hydrolysis of an already digested sludge results in better hydrolysis, the profitability is precarious.

Considering the thermal hydrolysis work, if the matter is not hydrolyzed, the bacterial population must be left to do the work passed on to this thermal hydrolysis and if the residence time in the hydraulic digester is not sufficient, the digester is destabilized.

In conclusion, the proportioning of the thermal hydrolysis and that of the digester are thus linked to the expected maximum loading.

However, often, the actual loading is much lower and fluctuating and the equipment is not used to the maximum of its capacity. This is because, due to the existence of a maximum digestion heel as a function of the sludge and of the thermal hydrolysis, even if the residence time in the digester is extended beyond the proportioning, the bacteria will not really work more. On the other hand, if the sludge is again hydrolyzed on exiting digestion, the thermal hydrolysis makes it possible to make organic material available again.

Finally, as previously indicated, a digester is a bacterial population equilibrium and it does not therefore know how to treat variations of loading, loading by weight and hydraulic loading. If the digester is underfed, a part of the bacterial population dies because of a lack of food, and in the case of a rapid increase in loading, the development of the bacterial populations is not sufficient to allow the digestion of all the food accumulated. Thus, the digester, even with a good hydraulic loading, will not treat all the organic matter that it could have treated and is "under-used".

Such methods are described in international applications WO 2012/019310 and WO 2013/155631, European application EP 0 564 298, Chinese application CN 203373248, application US 2012/094363 and Canadian application CA 2752747.

There is thus a need to provide methods for smoothing out the loading of the digester and for making it possible to feed it always close to its nominal value in order to avoid losses of bacterial populations.

Thus, the subject of the present invention is a method which makes it possible to solve all of the problems stated above, namely:
- minimization of the investment costs in order to make as profitable as possible the combination of the thermal hydrolysis and the digester used.
- maximization of the biogas production with the equipment installed.
- elimination of the jolts in loading and maintaining of the bacterial population close to its nominal value.
- management of the toxicity of the ammonia in the digester.

A subject of the invention is thus a method for treating pulp, in particular a method for treating purification plant sludge, for producing energy and/or organic matter that has been rendered hygienic, comprising:
 i. a step of aerated or non-aerated hydrolysis of the pulp,
 ii. optionally a step of dilution of the pulp hydrolyzed in step i),
 iii. a digestion step of mesophilic or thermophilic type either of the pulp hydrolyzed in step i), or of the pulp hydrolyzed and diluted in step ii),
 iv. a step of dehydration of the digested pulp resulting from the step iii) and
 v. a step of recirculation of part of the dehydrated pulp resulting from step iv) to the thermal hydrolysis step i).

In accordance with the invention, the part of the pulp that is recycled is calculated as a function of the degree of loading as explained hereinafter. This allows the thermal hydrolysis/digester coupled to work at constant loading, therefore without loading jolts.

In accordance with the invention, the thermal hydrolysis makes it possible to place the pulp to be treated, in particular the purification sludge, under pressure and at a temperature for a determined residence time with controlled conditions. This thermal hydrolysis step could be preceded by a step of pre-concentration of said pulp in order to decrease the size of the equipment used. The hydrolysis may be partial or total and the type of hydrolysis technology may be any type known to those skilled in the art. By way of nonlimiting example, mention may be made of the thermal hydrolysis methods described in international application WO 96/09882 or international application WO 2013/190486. This step must make it possible to maintain the pulp in a sufficient temperature and pressure state in order to make part of the organic matter rapidly digestible, thus
- to guarantee a residence time of the organic matter under the temperature conditions and with the desired amount of oxygen,
- to allow the introduction of the organic matter optionally under pressure,
- to allow the introduction of steam, and
- to maintain appropriate pressure and temperature conditions.

Ideally, in this step, the temperature is greater than 140° C., advantageously between 140 and 220° C., even more advantageously between 140 and 180° C., and the pressure is greater than 0.5 MPa (5 bar), advantageously between 0.5 MPa and 4 MPa (5 and 40 bar), even more advantageously between 0.6 and 1 MPa (6 and 10 bar).

This thermal hydrolysis step can be carried out in any type of vessel, the choice of these vessels and of the thickness of their walls being within the scope of those skilled in the art.

In accordance with the invention, the digestion step is carried out by any means or device and any technology known to those skilled in the art; by way of nonlimiting examples, mention may be made of: ovoid digesters, cylindrical digesters, which are stirred with biogas, mechanically or hydraulically. These devices are all subsequently denoted as digesters.

The digester is equipped with all the temperature regulation systems required for it to operate, in particular with heating and cooling systems to allow it to be controlled under the chosen conditions (mesophilic, thermophilic or the like). All these systems are part of the general knowledge of a person skilled in the art.

The step (ii) of dilution by adding water makes it possible to manage the concentrations in the digester. It is thus optional and those skilled in the art will know, by virtue of the various loading control systems of the thermal hydrolysis or of the digester or of both, whether this step should be carried out.

The fact of dehydrating at the outlet of digestion (step iv) allows the nitrogen to leave with the effluents. If an organic matter less loaded with nitrogen and thus less capable of releasing large amounts of ammonia into the digester is returned to the top of the digester, and the difference is made up with water not containing nitrogen, the concentration of free ammonia in the digester is decreased and the operation of the latter is relieved.

The step of recirculation of the dehydrated pulp resulting from step iv) to the thermal hydrolysis step i) is carried out by setting up a loop at the outlet of the dehydration step in order to again pass the dehydrated pulp into the thermal hydrolysis when the thermal hydrolysis/digester couple is available. This makes it possible to use the thermal hydrolysis device on the digested pulp when the digester and the thermal hydrolysis reactors are under used relative to the nominal value of the facility. Indeed, in the case of "maximal" loading, all of the stream passes into the thermal hydrolysis and also into the digester with residence times in these two pieces of equipment which are limiting with respect to the proportionings of the pieces of equipment. There is thus no space to return the sludge to the inlet of the thermal hydrolysis. On the other hand, in the case of a lower loading at the inlet, the dehydrated pulp can be returned to the thermal hydrolysis step and also to the digestion step.

Thus, in one advantageous embodiment of the invention, the method comprises a step of calculating the degree of loading of the thermal hydrolysis i) or of the digestion step ii) or of both.

In accordance with the invention, the amount of return, that is to say the part of the dehydrated pulp resulting from step iv) which is recirculated to the thermal hydrolysis step i), is controlled by the degree of loading calculated as previously mentioned in order to keep it as constant as possible and close to 1. A system of control (30, 31) of the degree of loading of the thermal hydrolysis means (13) or of the digestion means (14), or of both, is performed by controlling the amount of return originating from the dehydration (15) to the thermal hydrolysis (13).

In one advantageous embodiment of the invention, the method according to the invention comprises a dehydration step before the thermal hydrolysis step i) in order to obtain sufficient dryness, of about 10-30% of solids (ratio of the weight of solids to the total weight of solids+liquid), advantageously at 17% in order to minimize the size of the thermal hydrolysis reactor.

In another advantageous embodiment of the method according to the invention, said method comprises a step of injection of base or acid before the thermal hydrolysis step i) in order to control the pH during the digestion step ii) and to increase the hydrolysis during step i).

In another advantageous embodiment of the invention, the method comprises a step of cooling the waste between the thermal hydrolysis step i) and the digestion step ii).

If necessary, the method according to the invention can comprise a step of comminution or of desanding of the pulp, or both, upstream of the pieces of equipment used to carry out steps i) to iv).

In one advantageous embodiment of the invention, the method comprises a dehydration step before the thermal hydrolysis step i).

A subject of the invention is also a facility for treating pulp, in particular purification plant sludge, for carrying out the method according to the invention, said facility comprising a means of aerated or non-aerated thermal hydrolysis (13) communicating with a means of digestion (14) of the hydrolyzed pulp, said hydrolysis means communicating with pulp-conveying means (11) and means for conveying the pulp from a means of dehydration (15) of the pulp resulting from the digestion means (14) and means of evacuating the biogas (16) originating from said digestion means (14).

In accordance with the invention, the hydrolysis means can comprise one or more independent reactors installed in parallel. In the case of several reactors, the degree of loading is calculated on the basis of the number of reactors available.

In one advantageous embodiment of the invention, the facility comprises a means of regulating the pH (41) in the hydrolysis reactor by injecting an acid or a base so as to improve the hydrolysis kinetics and to control the pH of the digester in order to maintain a sufficiently low level of free ammonia.

When several hydrolysis reactors are operating, the injection of base or acid can be carried out exclusively in one of the reactors in order to greatly increase the hydrolysis in this reactor.

In one advantageous embodiment of the invention, the hydrolysis reactor which receives the acid or the base is the one receiving the effluents of step (v).

In another advantageous embodiment of the facility according to the invention, said facility comprises a system for controlling the degree of loading of the thermal hydrolysis means (30) or of the digestion means (31) or of both.

In order to enable clearer understanding of the method which is the subject of the present invention, the following are described hereinafter:

an embodiment. During this description, reference is made to FIG. 1 of the appended drawings, which is a diagram illustrating the various steps of the method according to the invention applied to purification plant sludge, and an example of implementation.

It remains of course that these examples have no limiting nature.

EMBODIMENT ACCORDING TO FIG. 1

The sludge (11) is pre-dehydrated in the element (12) in order to obtain sufficient dryness to minimize the size of the thermal hydrolysis reactor (13). This step is carried out by bringing the sludge to temperature and placing it under pressure. In accordance with the invention, it is possible to hydrolyze only part of the sludge. The type of hydrolysis technology is not taken into account here.

This reactor (or these reactors if need be) make(s) is possible:

to guarantee a residence time of the organic matter under the temperature conditions and with the desired amount of oxygen, to introduce organic matter optionally under pressure, to introduce steam and to maintain appropriate pressure and temperature conditions, that is to say conditions which are sufficient to make part of the organic matter rapidly digestible.

The hydrolyzed sludge at the outlet (13) is injected into the digester (14) after optional cooling (not represented) and after dilution by means of a system (43) of which the role will be described hereinafter. The sludge is then digested in the mesophilic or thermophilic digester (14), the residence time of which is adjusted to the nominal loading of the facility. This digester is proportioned with a residence time of between 10 and 25 days, preferentially 20 days in mesophilic operation, and 12 days in thermophilic operation. The digester has its own backup heating circuit (not represented on the diagram). The temperature in the digester is between 35 and 45° C., advantageously equal to 37° C., for mesophiles and between 50 and 60° C., advantageously equal to 55° C., for thermophiles.

Finally, at the outlet of the digester (14), a dehydration station (15) makes it possible to make the sludge available to a treatment or a final evacuation.

The tools for pretreating the sludge in order to remove the tows and the sand which can disrupt the thermal hydrolysis are also not represented.

A comminuting device and a desanding device are set up if required, depending on the quality of the sludge, in order to protect the downstream pieces of equipment.

Finally, the thermal fluid circuits which make it possible to heat the thermal hydrolysis and the digester are not represented.

The invention comes from the setting up of a loop at the outlet of the dehydration (15) in order to pass the sludge again into the thermal hydrolysis (13) when the thermal hydrolysis/digester (14) couple is available.

This is because, in the case of the "maximal" loading, all of the flow passes into the thermal hydrolysis (13) and also into the digester (14) with residence times in these two pieces of equipment which are limiting with respect to the proportioning of the pieces of equipment. There is thus no space to return the sludge to the inlet of the thermal hydrolysis (13).

On the other hand, in the case of a lower loading at the inlet (11), sludge can be returned to the thermal hydrolysis (13) and also to the digester (14).

The fact of dehydrating at the outlet of digestion makes it possible, in addition, for the ammonia to leave with the effluents. If sludge that is less loaded with nitrogen and thus less capable of releasing large amounts of ammonia into the digester is returned to the top of the digester (14), and the difference is made up with process water not containing nitrogen, the concentration of free ammonia in the digester is decreased and the operation of the latter is relieved.

The return to thermal hydrolysis (13) is controlled by several sensors (13b and 14b).

A flow rate measurement (20) and a concentration measurement (27) at the inlet of the thermal hydrolysis measures the degree of loading averaged on the basis of a characteristic time (typically from 0.5 to 5 residence times in the thermal hydrolysis) in order to calculate a degree of loading of the thermal hydrolysis. Added to this value are the measurement of flow rate (24) and a measurement of concentration (28) at the return of the dehydration (15). This degree of loading measurement can also be done by means of a number of fillings of the reactor (batches) or any other system which makes it possible to calculate the volume passing through the system, on the basis of the characteristic time.

This degree of loading is compensated by a sensor (13b) at the level of the thermal hydrolysis which determines the availability of the machine, that is to say the number of lines in parallel actually operating (for example a line undergoing maintenance).

The combination of the these two pieces of information determines an actual degree of loading (30) of the machine of between 0 and 1.

A measurement of flow rate (21) entering the digester measures the hydraulic residence time of the sludge in the digester.

This residence time is compensated by a piece of information originating from the digesters which determines an availability of the digesters.

This compensated residence time, divided by a nominal residence time defined by the method (typically from 10 to 25 days) determines a degree of loading (31) of the digester of between 0 and 1.

A measurement of concentration of the sludge at the inlet (25) completes the calculation of the degree of loading (31) by comparing the inlet loading relative to the acceptable weight loading of the digester.

A modifiable parameter of amount of organic matter relative to solids can also be entered into the system in order to calculate the loading on the basis of the organic matter.

Finally, the measurement of weight loading of the digester can also be carried out upstream of the thermal hydrolysis by means of a measurement of concentration at (27) and of flow rate at (20) before the thermal hydrolysis (13) completed by the measurement of the concentration (28) and of the flow rate (24) on the return loop. This is because the thermal hydrolysis has a tendency to dissolve organic matter which is therefore no longer accessible to the concentration measurement.

A final degree of loading 31 is thus calculated.

The maximum value which corresponds to the degree of loading of the facility is taken from the two degrees of loading 30 and 31.

This piece of information controls the return of the sludge (15) so that the calculated degree of loading is always equal to 1. This flow rate is controlled by a flow rate measurement (24).

A pH and ammonium analyzer (23) is located at the outlet of the digester. This sensor determines a concentration of free ammonia in the digester and a toxicity factor on the basis of this concentration.

This analyzer will trigger an injection of base at (41) and also of dilution water at (43) by means of a slow PID (proportional integral derivative) loop in order to have optimum conditions in the digester.

A measurement of concentration of the sludge (25) at the inlet of the digester and a measurement of concentration of the sludge (26) at the outlet of the digester make it possible to directly measure the degree of removal of the organic matter and thus the operating quality of the digester, and thus to correct in the long term the return of the digester.

The measurement of concentration (25) controls the dilution (43) so as to not to have too high a concentration in the digester, which would pose problems with stirring and thus with having a uniformly mixed reactor, a condition which is important for having good yields.

In another variant, the thermal hydrolysis is placed only on the dehydration returns (15) and is thus used only in the case of under-loading of the digester (14). This can be particularly advantageous in the case of sludges said to be "easy to digest", for which the provision of a thermal hydrolysis is not useful. Indeed, in this case, the digester is always used at the maximum of its capacities, even in the case of a decrease in loading, and fluctuations in loading in the digester are thus avoided, without having to invest in a pre-dehydration (12) and while constructing only a small thermal hydrolysis system (13) which will treat only a fraction of the sludge.

In a variant wherein in particular there are several thermal hydrolysis lines, in the event of under-loading, one of the lines is dedicated to the treatment of the return dehydrated sludges; this line is the one which receives the base or the acid.

In this line, in the event of an increase in free $NH_3$, without an increase in pH or in acidification in the digester, the pH which is particularly high in the hydrolysis reactor through addition of base will help to hydrolyze the organic matter, and to easily capture the return ammonia in the sludge of the hydrolysis reactor (foul gas 42).

In the case of an increase in pH at (23), the addition of acid in the reactor will also make it possible to help to hydrolyze the organic matter.

In the system according to the invention, the final dehydration (15) is not oversized relative to a standard operation because in any event the dehydration must be capable of treating the hydraulic peak. In other words, the returns are made only if the configuration is not that of the hydraulic peak, and thus there is never any overloading of the dehydration.

Example of Calculation of Optimization of a Thermal Hydrolysis Reactor and of a Digester In the case of a sludge at 100 tSolids/d 75% MV at peak and 80 tSolids/d at peak over a course of 15 days, if a thermal hydrolysis of 1 h at a concentration of 16% and a digestion of 15 days at an input concentration of 9% are envisioned, then a reactor of: $100/0.16/24 \times 1 = 26$ m$^3$ is obtained and a digester of $80/0.09 \times 15 = 13\ 333$ m$^3$ is obtained.

The thermal hydrolysis reactor is proportioned on the basis of a daily or twice-daily peak as a function of the sludge buffer tank located upstream, while the maximum loading of the digester is that corresponding to a peak of 15-20 continuous days.

It is thus possible to proportion the reactor on the basis of a peak for example of 5 continuous days, for example 85 tSolids/d. This thus decreases the reactor by 15% at constant hydraulic flow rate.

Next, for passing the peak of 100 tSolids/d, the residence time in the reactor will be decreased: 51 minutes instead of 60 minutes.

However, the sludge that would have been hydrolyzed only for 51 minutes, over the course of the 15 days of the residence time in the digester, may rethicken in the thermal hydrolysis since the loading will subsequently still be less than 100 tSolids/d.

Thus, if proportioning is done on the basis of 51 minutes in the reactor for this entire peak, during the 4 peak days, 81.25 tSolids/d is obtained (to produce 85 t over the course of 5 days) and over the course of the next 10 days in the reactor 77.5 tSolids/d are obtained (or 19.4 t wet matter/d) (to produce 80 tSolids/d over the course of 15 days).

It is thus possible to treat, for 4 days, 18.75 tSolids/d at the return, which corresponds to approximately (MV outlet 60%) 7.5 t wet matter/d;

and for 10 days 22.5 tSolids/d, which corresponds to approximately 9 t wet matter/d.

This thus gives, over the course of the 15 days, 75 t wet matter recirculated for 300 t wet matter injected from the outside, i.e. 25% recirculation, which means that, over this period of 15 peak days, by virtue of the recirculation and despite a decreased hydrolysis time of 51 min, the sludge will have been subjected to an actual hydrolysis time of 51×1.25=64 min.

An actual hydrolysis of the sludge is thus obtained which is at its nominal value despite a shorter physical time.

The recirculation thus makes it possible to use each of the two pieces of equipment at their nominal values for as long as possible by using the uncoupling of the residence times between the hydrolysis and the digestion.

The invention claimed is:

1. A method for treating pulp, in particular a method for treating purification plant sludge, for producing energy and/or organic matter that has been rendered hygienic, comprising
    i. a step of aerated or non-aerated thermal hydrolysis of the pulp,
    ii. optionally a step of dilution of the pulp hydrolyzed in step i),
    iii. a digestion step of mesophilic or hermophilic type either of the pulp hydrolyzed in step i), or of the pulp hydrolyzed and diluted in step ii),
    iv. a step of dehydration of the pulp resulting from the step iii) and
    v. a step of recirculation of part of the dehydrated pulp resulting from step iv) to the thermal hydrolysis step i), wherein the part of the dehydrated pulp resulting from step iv) which is recirculated to the thermal hydrolysis step i) is controlled by the degree of loading in order to keep it as constant as possible and close to 1 and wherein the rest of the dehydrated pulp resulting from step iv) is evacuated.

2. The method as claimed in claim 1, further comprising a step of calculation of the degree of loading of the thermal hydrolysis i) or of the digestion step ii) or of both, wherein:
    the rate of loading of the thermal hydrolysis is calculated from the measurements of the flow rate (20) and of the concentration (27) at the inlet of the thermal hydrolysis and of the residence time in the thermal hydrolysis, to which it is added the measurements of flow rate (24) concentration (28) at the return of the dehydration (15),
    the rate of loading of the digestion step is calculated from the measurements of flow rate (21) entering into the digester, the nominal residence time and the concentration of the sludge at the inlet (25) of the digester.

3. The method as claimed in claim 1, further comprising a step of injection of base or of acid before the thermal hydrolysis step i) in order to control the pH during the digestion step ii) and to increase the hydrolysis during step i).

4. The method as claimed in claim 3, wherein several hydrolysis reactors are operating in parallel and for which the injection of base or of acid is carried out exclusively in one of the reactors in order to greatly increase the hydrolysis in this reactor.

5. The method as claimed in claim 4, wherein the hydrolysis reactor receiving acid or base is the one receiving the effluents of step v) and wherein:
    in case of an increase in free $NH_3$, without an increase in pH or in acidification in the digester as detected by the pH and ammonium analyzer (23), the addition of base in the hydrolysis reactor is performed to help the hydrolysis of the organic matter, and
    in the case of an increase in pH as detected by the pH and ammonium analyzer (23), the addition of acid in the hydrolysis reactor is performed to help to hydrolyze the organic matter.

6. A facility for treating pulp, in particular purification plant sludge, for carrying out a method as claimed in claim 1, said facility comprising a means of aerated or non-aerated thermal hydrolysis (13) communicating with a means of digestion (14) of the hydrolyzed pulp, said hydrolysis means communicating with means for conveying the pulp (11) resulting from the pre-dehydration means (12) and means for conveying said pulp recycled from a means of dehydration (15) of the pulp resulting from the digestion means (14) and means for evacuating biogas (16) originating from said digestion means (14) and a system for controlling (30, 31) the rate of loading of the thermal hydrolysis means (13) or of the digestion means (14) or of both, by controlling the amount of return originating from the dehydration (15) to the thermal hydrolysis (13), wherein the rate of loading of the thermal hydrolysis means is compensated by the sensor (13b) and the rate of the digestion means is compensated by the sensor (14b).

7. The facility as claimed in claim 6, further comprising a means of regulating the pH (41) in the hydrolysis reactor by injecting an acid or a base so as to improve the hydrolysis kinetics.

* * * * *